United States Patent
Iverson et al.

(10) Patent No.: US 6,852,348 B2
(45) Date of Patent: Feb. 8, 2005

(54) METHOD OF TREATING PRODUCE

(75) Inventors: Carl E. Iverson, Olympia, WA (US); Scott P. Ager, Tumwater, WA (US)

(73) Assignee: CH20 Incorporated, Olympia, WA (US)

( * ) Notice: Subject to any disclaimer, the term of this patent is extended or adjusted under 35 U.S.C. 154(b) by 71 days.

(21) Appl. No.: 10/190,772

(22) Filed: Jul. 5, 2002

(65) Prior Publication Data

US 2004/0005393 A1 Jan. 8, 2004

(51) Int. Cl.[7] .................................................. A23B 7/00
(52) U.S. Cl. ..................... 426/312; 426/532; 426/561; 426/506; 426/519
(58) Field of Search .............................. 426/561, 312, 426/532, 506, 519

(56) References Cited

U.S. PATENT DOCUMENTS

| | | | |
|---|---|---|---|
| 3,869,559 A | * 3/1975 | Clark | 426/481 |
| 3,892,563 A | * 7/1975 | La Point | 241/20 |
| 4,339,468 A | * 7/1982 | Kielsmeier | 426/582 |
| 5,858,443 A | * 1/1999 | Hei et al. | 426/506 |
| 5,863,584 A | * 1/1999 | Thomas et al. | 426/335 |
| 6,362,152 B1 | * 3/2002 | Young et al. | 510/386 |

FOREIGN PATENT DOCUMENTS

JP       62144683 A   *   6/1987

* cited by examiner

*Primary Examiner*—Drew Becker
(74) *Attorney, Agent, or Firm*—Delbert J. Barnard

(57) ABSTRACT

Sodium ortho-phenylphenate is admixed with water to produce a process water for treating produce. Potassium carbonate is admixed with the process water in an amount necessary to necessary to raise the specific gravity of the process water to a level whereat it will float fruits and vegetables that would otherwise tend to sink in the process water. When a chlorine-based biocide is used in the process water potassium bicarbonate is used to provide the desired specific gravity of the process water. Over time, used process water is cleaned by settling, by use of a filter, or by use of some other mechanical separating equipment, and the cleaned process water is recycled.

18 Claims, 1 Drawing Sheet

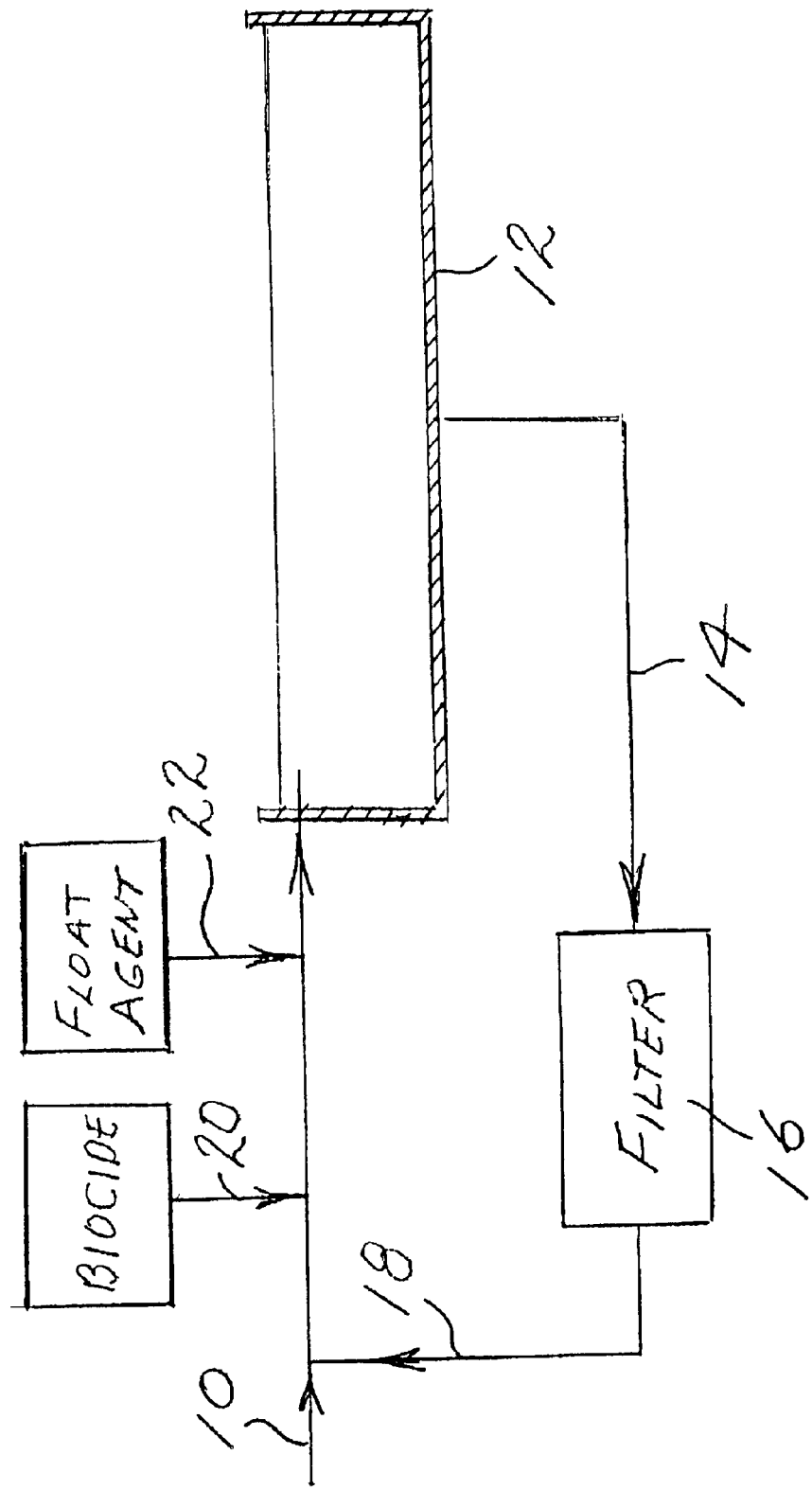

METHOD OF TREATING PRODUCE

TECHNICAL FIELD

This invention relates to a method of treating produce while the produce is floating in an aqueous solution. More particularly, it relates to admixing an additive to the aqueous solution of a type and in an amount sufficient to provide the solution with a specific gravity sufficient to float the produce that is being treated.

BACKGROUND OF THE INVENTION

It is known to modify the specific gravity of a process water solution in order to make produce float in the solution, by admixing sodium lignosulfonate, sodium silicate, or sodium sulfate with the solution, in an amount sufficient to cause the produce to float when introduced into the solution. Sodium lignosulfonate, sodium silicate and sodium sulfate have significant drawbacks, however, including low solubility and a slow rate of dissolution. They are abrasive to the equipment and they cause phytotoxicity, biological oxygen demand (BOD), and wastewater color problems, as well as pH incompatibilities and disposal problems at publicly operated treatment works.

There is a need for a way of controlling the specific gravity of process water without experiencing the various problems that are encountered when using sodium lignosulfonate, sodium silicate and/or sodium sulfate. An object of the present invention is to provide an improved method of raising the specific gravity of process water, so that produce, such as and including pears, will readily float in the process water. An object of the invention is to control the specific gravity of process water and at the same time extend the use life of the process water. A primary object of the present invention is to address this problem and provide solutions to the problem that are relatively simple and inexpensive.

BRIEF SUMMARY OF THE INVENTION

The invention is basically characterized by a tank or flume which contains a body of water. Produce of a type that wants to sink in the water is introduced into the water and tank or flume. To prevent the produce from sinking, potassium carbonate and/or potassium bicarbonate are admixed with the water in an amount sufficient to raise the specific gravity of the water an amount sufficient to cause the produce to float in the water. The water is then used for transporting the produce short or long distances.

Water and a biocide are admixed to produce process water that is introduced into a tank. Produce of a type that wants to sink in the process water is introduced into the process water in the tank. Potassium carbonate and/or potassium bicarbonate are admixed with the process water in an amount sufficient to raise the specific gravity of the process water an amount sufficient to cause the produce to float in the process water.

The invention includes making periodic additions of the potassium carbonate and/or potassium bicarbonate to the process water in amount sufficient to maintain the desired specific gravity of the process water.

Sodium ortho-phenylphenate may be used as the biocide. In which case, potassium carbonate will be used to raise the specific gravity of the process water. Or, a chlorine-based biocide may be used. In which case, potassium bicarbonate will be used to raise the specific gravity of the process water.

According to a feature of the invention, the process water is periodically cleaned, such as by filtering, and the clean process water is recycled.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

The drawing FIGURE is a flow diagram showing introduction of process water into a tank and the admixing of a biocide with the process water prior to it being introduced into the tank, and the filtering and recycling of the process water.

DETAILED DESCRIPTION OF THE INVENTION

U.S. Pat. No. 5,863,584, granted Jan. 26, 1999, to Thomas Iverson, Jr., Joyce Prindle and Robert E. Keith discloses a method and apparatus for treating fresh produce to remove debris and inhibit the growth of fungus on the produce and to a method for treating contaminants in the process water. The patent discloses the use of chlorine dioxide as a biocide. The chlorine dioxide is admixed with water to produce the process water and the process water is used to treat produce, with a specific disclosed example being apples. The process water formed by the chlorine dioxide and water functions to float the apples while they are in the process water. The process water is introduced into a tank and the apples are introduced into the process water in the tank. U.S. Pat. No. 5,863,584 shows equipment for delivering the produce to the tank, for transporting empty produce boxes away from the tank, and conveying apparatus which receives the produce from the tank and moves it on for further treatment.

The present invention comprises process water treatment of produce that wants to sink in the process water such as pears, for example. The present invention provides an additional treatment of the process water for the purpose of raising its specific gravity to where the produce will float rather than sink when in the process water. The method and apparatus for otherwise treating the produce may be like what it disclosed in U.S. Pat. No. 5,863,584. The disclosure of U.S. Pat. No. 5,863,584 is hereby incorporated herein by this specific reference.

Referring to the single drawing FIGURE, clean water, e.g. water system water, is delivered into conduit 10 and is fed towards a tank 12. A biocide is delivered via conduit 20 into admixture with the water in conduit 10. A float agent is delivered through a conduit 22 in admixture with the water and biocide mixture in conduit 10. The resulting mixture of water, biocide and float agent is delivered into the tank 12.

In one embodiment, the biocide is sodium ortho-phenylphenate and the float agent is potassium carbonate. The potassium carbonate is used in a sufficient amount to raise the specific gravity of the process water to where it is sufficient to float the particular produce that is being treated. For example, a forty-seven percent by weight aqueous solution of potassium carbonate may be produced. This solution is then admixed with the process water at approximately a one-to-ten ratio by volume. This results in a specific gravity of approximately 1.05 which is sufficient to float pears and other produce that behave similar to pears when placed in the process water.

It is preferred to use potassium carbonate when sodium ortho-phenylphenate is the biocide. This is because of the pH constraints of the sodium ortho-phenylphenate.

In another embodiment, a chlorine-based biocide is used and sodium bicarbonate is used as the float agent. This is because potassium bicarbonate in admixture with the chlorine-based biocide produces a neutral pH solution.

For example, a five percent solution of potassium bicarbonate in the process water will usually be an amount sufficient to float pears and similarly acting fruits and vegetables in the process water.

Periodic additions of the float agent are added to the process water to maintain the desired specific gravity of the process water. Also, the useful life of the process water can be extended by cleaning the process water of debris, such as by use of settling, filtering or other mechanical separating equipment. Contaminants are removed and then the process water is recycled, often times with the addition of additional biocide and additional float agent.

The drawing FIGURE shows used process water being removed from the tank 10 via a conduit 14 and delivered to a filter 16. It is filtered at 16 to remove soil and debris, etc. and then it is directed back into the tank 12. The drawing FIGURE shows fresh water and recycled process water being admixed, followed by a biocide and then a float agent being admixed with the process water before it is delivered into the tank 12.

In another installation, the recycled process water can be handled and treated separately from the new process water. That is, clean water and a biocide and a float agent may be admixed to form a process water solution that is delivered into the tank 12. Recycled process water may be directed through conduit 14 to and through the filter 16 and then admixed with a biocide and float agent separately from the fresh water 10, to produce a recycled process water solution that is then delivered into the tank 12.

As can be seen, the tank 12 is a form of flume in which the produce floats. The water serves to convey the produce while it is in the tank or flume and towards an outlet from the tank or flume. Accordingly, the invention is not limited to use with a process water system such as is disclosed and described. Rather, it can be used in any environment in which it is desired to float and transport produce that would normally sink in the water if the float additive were not added.

The illustrated embodiments are only examples of the present invention and, therefore, are non-limitive. It is to be understood that many changes in the particular structure, materials and features of the invention may be made without departing from the spirit, and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. A method of transporting produce in water, said method comprising:
   providing a flume;
   introducing water into said flume;
   introducing produce into said water, said produce being of a type that will want to sink in the water; and
   admixing potassium carbonate and/or potassium bicarbonate with the water in an amount sufficient to raise the specific gravity of the water an amount sufficient to cause the produce to float in the water.

2. The method of claim 1, wherein the produce comprises pears.

3. The method of claim 1, further comprising making periodic additions of the potassium carbonate and/or potassium bicarbonate to the water in amounts sufficient to maintain the desired specific gravity of the water.

4. The method of claim 3, wherein the produce comprises pears.

5. The method of claim 1, wherein the water includes a biocide.

6. The method of claim 5, comprising using sodium ortho-phenylphenate as the biocide.

7. The method of claim 5, comprising removing contaminants from the water, and then recycling the water.

8. The method of claim 1, comprising introducing a substance usable for treating produce into the water and the flume.

9. A method of removing contaminants from process water and from produce in the process water, said method comprising:
   producing a tank;
   introducing process water into said tank, said process water comprising water and a biocide;
   introducing produce into said process water, said produce being of a type that will want to sink in the process water; and
   admixing potassium bicarbonate with the process water in an amount sufficient to raise the specific gravity of the process water an amount sufficient to cause the produce to float in the process water.

10. The method of claim 9, wherein the produce comprises pears.

11. The method of claim 9, further comprising making periodic additions of the potassium bicarbonate to the process water to maintain the desired specific gravity of the process water.

12. The method of claim 11, wherein the produce comprises pears.

13. The method of claim 9, wherein the biocide is chlorine based.

14. The method of claim 10, further comprising removing contaminants from the process water and then recycling the process water.

15. The method of claim 14, comprising removing contaminants from the process water by filtering the process water and then recycling the filtered process water.

16. The method of claim 13, wherein the produce comprises pears.

17. The method of claim 14, wherein the produce comprises pears.

18. The method of claim 15, wherein the produce comprises pears.

* * * * *